INVENTOR.
ROBERT C. CARTER

BY Moody & Anderson
AGENTS

RC CORRELATOR CIRCUIT FOR SYNCHRONOUS SIGNAL DETECTION

Filed May 24, 1965 8 Sheets-Sheet 2

INVENTOR.
ROBERT C. CARTER
BY Moody & Anderson
AGENTS

Feb. 13, 1968 R. C. CARTER 3,369,185

RC CORRELATOR CIRCUIT FOR SYNCHRONOUS SIGNAL DETECTION

Filed May 24, 1965 8 Sheets-Sheet 3

INVENTOR.
ROBERT C. CARTER

BY Moody & Anderson

AGENTS

INVENTOR.
ROBERT C. CARTER
BY Moody & Anderson
AGENTS

INVENTOR.
ROBERT C. CARTER
BY Moody & Anderson
AGENTS

RC CORRELATOR CIRCUIT FOR SYNCHRONOUS SIGNAL DETECTION

INVENTOR.
ROBERT C. CARTER
BY Moody & Anderson
AGENTS

INVENTOR.
ROBERT C. CARTER
BY *Moody & Anderson*
AGENTS

RC CORRELATOR CIRCUIT FOR SYNCHRONOUS SIGNAL DETECTION

Filed May 24, 1965 8 Sheets-Sheet 8

INVENTOR.
ROBERT C. CARTER

BY Moody & Anderson
AGENTS

3,369,185
RC CORRELATOR CIRCUIT FOR SYNCHRONOUS SIGNAL DETECTION

Robert C. Carter, Richardson, Tex., assignor to Collins Radio Company, Cedar Rapids, Iowa, a corporation of Iowa Filed May 24, 1965, Ser. No. 458,157
17 Claims. (Cl. 329—50)

This invention relates generally to phase detection techniques and more particularly to that segment of the phase detecting art wherein synchronous demodulating is required in rather poor signal-to-noise applications.

The present invention is especially applicable to the detection of Kineplex signals but not specifically limited to this application. The Kineplex data transmission system transmits information in binary form by encoding information bits as discrete phase shifts between successive synchronous transmission intervals. Previously, detection of Kineplex signals has been accomplished by means of keyed AC integrators. For a description of this basic technique, reference is made to "Binary Data Transmission Technique For Linear Systems" by M. L. Doelz, E. T. Heald and D. L. Martin, Proceedings IRE, Volume 45, 5 May 1957. Reference is further made to U.S. Patent No. 2,905,812 to M. L. Doelz, entitled "High Information Capacity Phase-Pulsed Multiplex Systems" wherein is described a Kineplex data transmission system.

The Kineplex data transmission systems as defined in the above references describe systems employing demodulation of a plurality of tones modulated on a carrier with each tone being in turn phase-pulse modulated. Binary information is encoded as phase shifts between adjacent synchronous intervals or transmission frames. The demodulation technique may employ high-Q resonators as a means for regenerating at the receiver a phase reference for each successive transmission interval. Detecting means are employed to compare the phase of each transmission interval with that of the preceding one. Each transmission interval is accordingly utilized at the receiver as a phase reference for the following interval.

Copending application, Ser. No. 458,158, filed May 24, 1965, entitled "Demultiplexing and Detecting System for Predicted Wave Phase-Pulsed Data Transmission System" by Robert C. Carter, Paul M. Cunningham and Robert D. Tollefson, assigned to the assignee of the present invention and filed concurrently with the present invention, defines a demodulating system for a Kineplex type of transmission wherein a completely electronic system of product detection and integration may be employed in lieu of the mechanical high-Q resonator technique defined in the above references. As defined in the copending application, the detection means beats each tone down to D.C. The D.C. component is then integrated over a "Drive Time" interval to yield phase information. For this purpose, the incoming signal is described as being applied to first and second channels, each channel mixing the incoming signal with first and second quadraturized reference signals at the incoming signal frequency. The outputs from the mixers in the two channels are alternately, and in synchronism with the input transmission intervals, applied to integrators such that the outputs from the integrators in the first channel are proportional to sin $(\theta_1-\theta_R)$ and cos $(\theta_1-\theta_R)$ respectively and the outputs from the integrators in the second channel are proportional respectively to sine $(\theta_2-\theta_R)$ and cos $(\theta_2-\theta_R)$ respectively, where the expressions $(\theta_1-\theta_R)$ and $(\theta_2-\theta_R)$ correspond to the difference in phase between successive input signal intervals (defined by phases $\theta_1$ and $\theta_2$) and the reference signal (defined by phase $\theta_R$). Four outputs are thus derived; two quantities defining the phasor for one frame and two for the following frame. These four quantities may then be compared at a particular instant in time (referred to as sample time in Kineplex systems) to make a determination of phase shifts from frame to frame.

The present invention is applicable to the method of phase detection, storage and information handling described in the referenced copending application and is concerned particularly with a type of basic circuit that detects and integrates. It is an object of the present invention accordingly to provide a basic circuit for receiving a phase-pulse modulated input signal and an internally generated reference signal of like frequency, and to develop therefrom an output signal proportional to the integral of the product of the input and reference signals over a time T, where T is the synchronous time interval defining a period of time during which the input signal is applied.

A further object of the present invention is the provision of a synchronous detecting and integrating circuitry operable over a wide temperature range and having a dynamic range sufficiently large so as not to limit the output.

A still further object of the present invention is the provision of a detecting and integrating circuitry which may be easily reset to zero at desired synchronous intervals and which, during that period of time when an integration function is desired, provides an extremely linear integration function.

A still further object of the invention is the provision of a detecting and integrating circuitry capable of holding or storing integrated data without change for a synchronous period.

The present invention is featured in the provision of a simple circuitry which may accomplish the above recited objects with a minimum of component requirements and expense and thus may be economically repeated numerous times in an equipment.

These and other features and objects of the present invention will become apparent upon reading the following description in conjunction with the accompanying drawings in which.

Because of its especial utility as a detecting and integrating device in a Kineplex data transmission system, the present invention will be described in close correlation with such a system. It is to be emphasized however, that the circuitry in its basic form as presented here is not considered to be limited to this specific application but may find usage in other applications necessitating synchronous demodulating under conditions of rather poor signal-to-noise ratio.

The above referenced publications define the basic Kineplex data transmission concept. It might be emphasized here that the basic Kineplex transmission system is one wherein synchronous transmission intervals are employed. Information is encoded at the transmitter in the form of discrete phase shifts between successive transmission intervals such that the phase reference at the receiver for any particular transmission interval or frame becomes merely the phase of the preceding interval. Whereas earlier Kineplex systems employed mechanical resonators in pairs for each received tone, the above-referenced copending application describes a system of beating the incoming signal to D.C. and integrating the D.C. component over a transmission interval or "drive time" to yield phase information from a particular tone.

The phase shift between successive frames is derived in the form of sine and cosine functions of the phasor which defines the shift.

The basic function of the demodulating and detecting circuitry in a Kineplex system is that of defining the phase of a transmission interval or frame using integration techniques, retaining or storing this information for a succeeding frame, and then resetting, or dumping the integrator to zero to ready it for a succeeding integration cycle. A dual-channel approach is utilized wherein one channel is storing the information obtained from a preceding frame, while a second channel is obtaining information on the instant frame. At a time prior to the conclusion of each frame, all integrator outputs are sampled. The samples contain the necessary information from which the phase shift between successive frames may be recovered and from which the binary information encoded as these phase shifts may be reconstructed for readout purposes or for register storage as desired.

Figure 8:
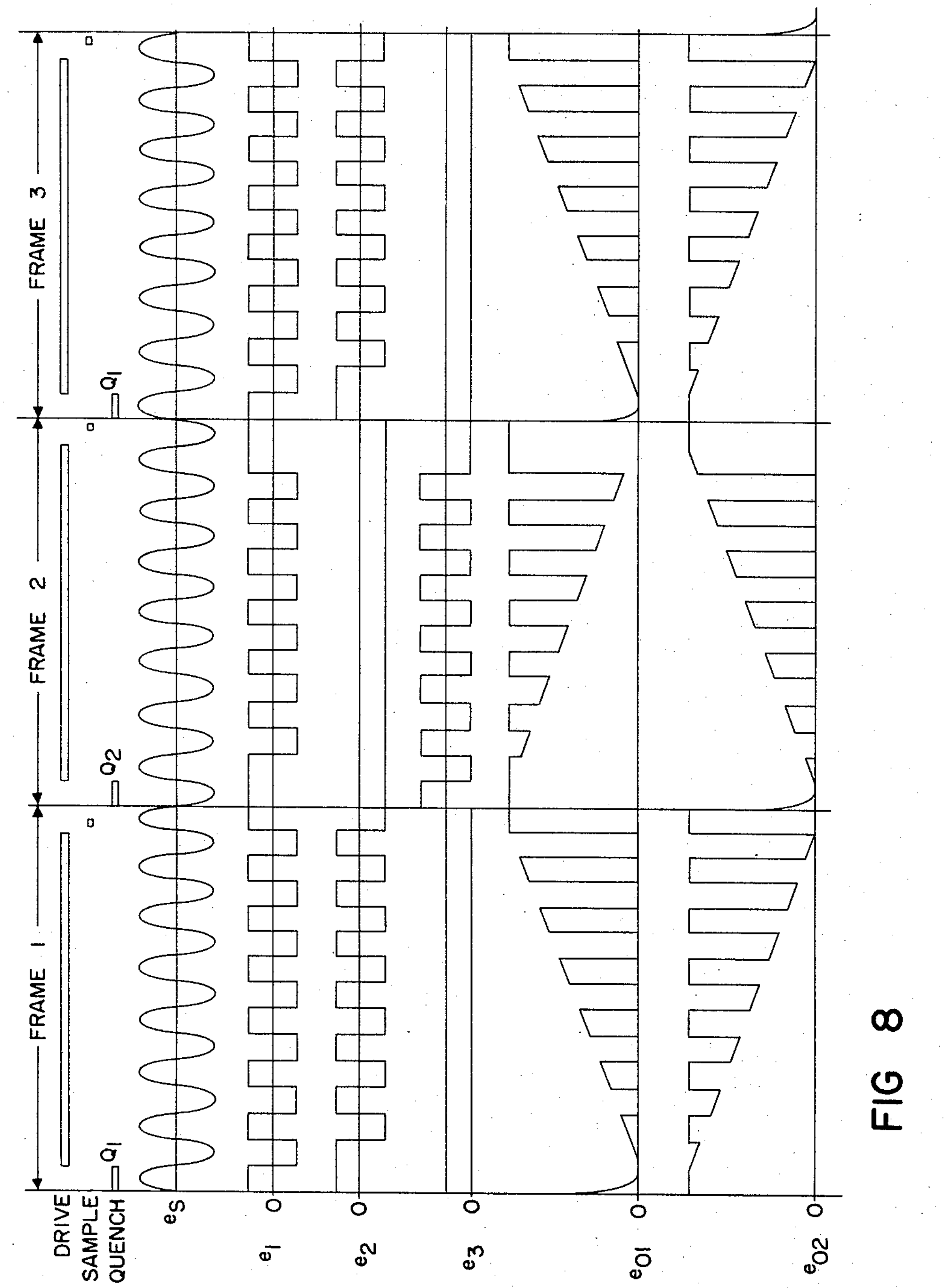
FIGURE 8 illustrates operational waveforms of the embodiment of FIGURE 7.

Before proceeding with the description of the circuitry of this invention, reference is briefly made to the operational waveforms of FIGURE 8 wherein three successive frames or transmission intervals are depicted. Each frame is seen to bracket a lesser time interval depicted as the "drive time." Subsequent description will bear out that the drive time is that period of time during which the phase of the particular interval is "measured." Preceding the initiation of the drive time in each frame is a shorter period referred to as the "quench." These intervals refer to time allocated for the resetting of the integrator associated with a particular channel to zero prior to its integration function during a "drive time." At the conclusion of each drive time and prior to the conclusion of the frame, a still lesser time interval is maintained which is defined as "sample" time. During this period of time, the outputs of the integrators in both channels are sampled or gated to subsequent detecting circuitry.

In accordance with the system defined in the above-referenced copending application, the composite input signal during frame 1 is mixed with first and second quadraturized reference signals and the products gated through "drive time 1" gates or switches to a pair of integrators. The outputs from the integrators are proportional respectively to the sine and cosine functions of the difference in phase between the input signal phase peculiar to frame 1 and the phase of the reference signal. During frame 2, the phase information obtained in these integrators is retained and the input signal, mixed with the quadraturized reference signals, is gated through "drive time 2" switches or gates to a further pair of integrators the outputs of which correspond respectively to the sine and cosine functions of the difference in phase between that of the incoming signal during frame 2 and the reference signal. The referenced copending application accordingly describes an entire mixing, phase detecting, storage, and information handling system permitting demultiplexing and demodulating of a composite Kineplex input signal without the necessity of incorporating mechanical resonators in the demodulating process.

The present invention is concerned with a basic circuitry which may be employed in multiples to arrive at a demultiplexing and demodulating circuitry as defined in the copending application.

Figure 1:
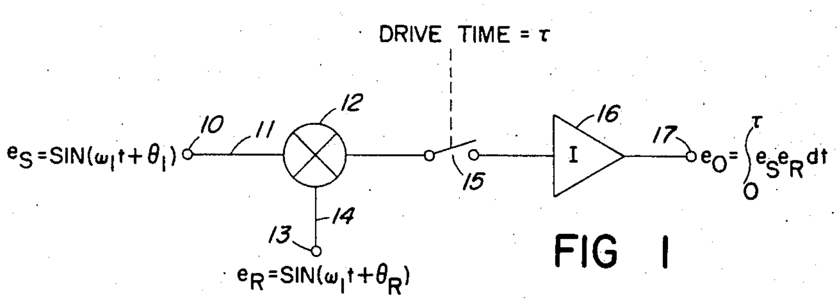
FIGURE 1 is a diagram of the basic functions to be performed by the invention.

The basic function to be performed is depicted in FIGURE 1. The input signal $e_S$ is applied as a first input 11 to a product detector 12. Product detector 12 receives a second input 14 in the form of reference signal $e_R$. The output of the product detector 12 is applied, during intervals defined by the closing of a drive time switch 15, to an integrator 16. The integrator 16 produces an output 17 proportional to the integral over the drive time T of the product of the signals $e_S$ and $e_R$ applied to the detector 12.

In operation, the circuitry of FIGURE 1 basically mixes the signal tone $e_S$ with the reference $e_R$ to produce an output including a D.C. component which is integrated over a specified length of time T. If the input signal $e_S$ is defined as $\sin(\omega_1 t+\theta)$ and the reference signal is defined as $\sin(\omega_1 t+\theta_R)$, the integrator output 17 will be a D.C. voltage proportional to the cosine of the difference phase angle of the input, i.e., $\cos(\theta_1-\theta_R)$. This voltage may then be used in conjunction with other similarly produced voltages to yield information concerning the phase of the incoming tone $e_S$ from frame to frame.

The major output components of the mixer 12 of FIGURE 1 are the sum and difference frequencies of the two inputs. Since the inputs have been defined as being of the same frequency, a $2\omega_1$ component and a D.C. component will be present at the output as given by;

$$\sin(\omega_1 t+\theta_1)\sin(\omega_1 t+\theta_R) =\tfrac{1}{2}[\cos(\theta_1-\theta_R)-\cos(2\omega_1 t+\theta_1+\theta_R)] \quad (1)$$

If, as above defined, the drive time switch 15 of FIGURE 1 is closed for T time, and the output of mixer 12 is integrated over this interval, the output 17 of integrator 16 may be expressed as;

$$e_o=\int_0^T \cos(\theta_1-\theta_R)dt \int_0^T \cos(2\omega_1 t+\theta_1+\theta_R)dt \quad (2)$$

$$e_o=\frac{T}{2}\cos(\theta_1-\theta_R) -\frac{1}{4\omega 1}\left[\sin(2\omega_1 t+\theta_1+\theta_R)-\sin(\theta_1+\theta_R)\right]$$

$$e_o=\frac{T}{2}\left\{\cos(\theta_1-\theta_R) -\frac{1}{2T\omega_1}[\sin(2\omega_1 T+\theta_1+\theta_R)-\sin(\theta_1+\theta_R)]\right\} \quad (3)$$

In the case under consideration here, there are actually hundreds of cycles of input signals at frequency $\omega_1 t$ occurring during the drive time T. That is to say, $\omega_1 T>>1$.

Therefore, the right hand term of Equation 3 is very small and $$e_o\cong\frac{T}{2}\cos(\theta_1-\theta_R) \quad (4)$$

Reference to the integrator output $e_0$ as expressed in Equation 4 shows that the D.C. output at the end of the drive time T is proportional to the cosine of the difference angle between the incoming signal $e_S$ and the reference signal $e_R$.

The requirements of a physical embodiment of FIGURE 1 are as follows:

(1) The circuit must operate over a wide temperature range.

(2) The circuit must provide sufficient dynamic range so as not to limit the signal.

(3) The output must not have any undesired spurious outputs or D.C. off-sets.

(4) The circuit must be easily "reset."

(5) The circuit must provide very linear integration over the entire drive time. That is, the time constant of the integrator must be very large compared to the drive time.

(6) The circuit must "hold" or "store" the integrated data without change during one frame time.

(7) The circuit must be simple, since, in a system embodiment it will be repeated many times.

Figure 2:
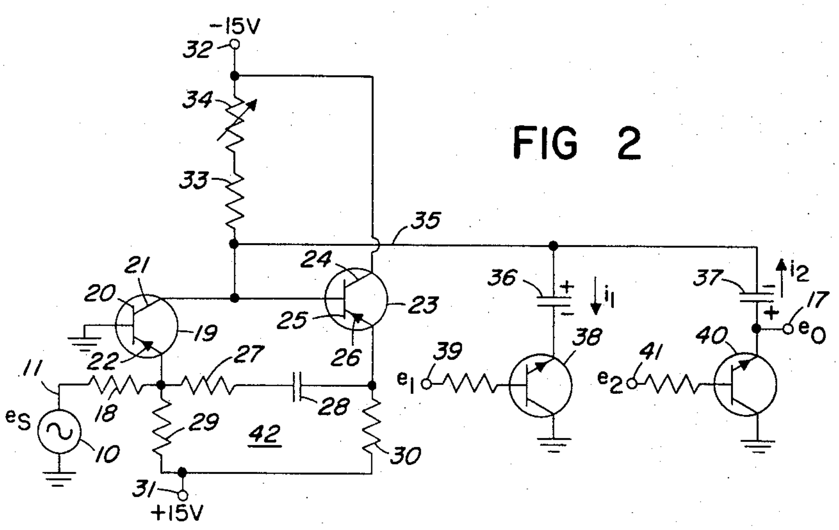
FIGURE 2 is a schematic diagram of a full-wave embodiment of the invention.

In accordance with the present invention the embodiment of FIGURE 2 fulfills the above-enumerated requirements. With reference to FIGURE 2 the input signal 10 is applied to a feedback amplifier 42 comprised of transistors 19 and 23 and associated circuitry. Transistors 19 and 23, in the configuration illustrated, form an amplifier that has an essentially infinite output impedance. The amplification of the amplifier 42 over the required dynamic range is also extremely linear. These requirements are essential to the proper operation of the circuitry. Because of the critical design criteria that must be met by the amplifier 42, further description of this amplifier circuitry will consider the design aspect in detail. For the moment, it will suffice to state that the amplifier has essentially infinite output impedance such that it acts as a constant current source. The output 35 of the amplifier is applied to first ends of a pair of capacitors 36 and 37 the other ends of which may be selectively grounded through the emitter collector paths of transistors 38 and 40, respectively. Comparing the FIGURE 2 configuration with the basic diagram of FIGURE 1, the transistors 38 and 40 operate as switches and perform the required mixing operation. The conductivity of switching transistors 38 and 40 is controlled by the application of switching control signals $e_1$ and $e_2$, respectively. Signals $e_1$ and $e_2$ are, collectively, the reference signal $e_R$ depicted in FIG. 1. As will be further described, the switching signals $e_1$ and $e_2$ cause the transistors 38 and 40 to be alternately conductive at a rate defined by the reference signal.

Figure 3:
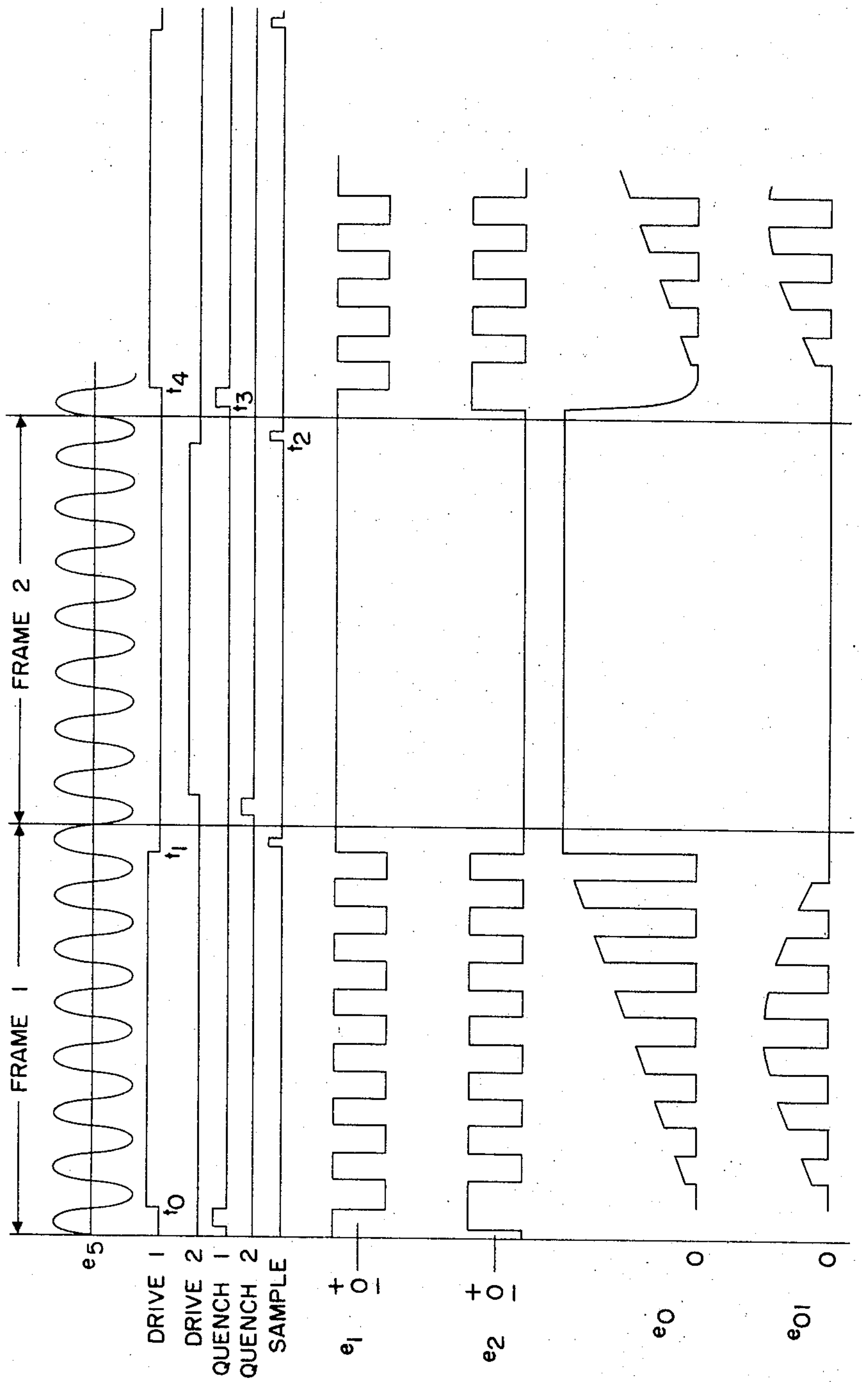
FIGURE 3 illustrates operational waveforms of the embodiment of FIGURE 2.

Reference is made to the waveforms of FIG. 3 wherein the input signal $e_S$ is assumed to be a sine wave which might be defined as A sin $(\omega_1 t+\theta)$. The signal $e_S$ is depicted as it occurs throughout two successive frame intervals and in time correlation with drive time, quench and sample gating signals which are peculiar to Kineplex data transmission systems and which may be generated in synchronism with the input signal $e_S$ by various synchronized time-base generating circuitry such as referred to in the above referenced publications. For simplicity, the input signal $e_S$ is shown without phase shift from frame to frame, it being understood that normally an odd multiple of 45° shift would occur instantaneously at the end of each frame period in accordance with Kineplex data transmission system techniques.

The reference signal is in the form of a pair of signals $e_1$ and $e_2$ each of which is a square wave at the same frequency as $e_S$. During drive 1 time the reference signals $e_1$ and $e_2$ are complementary. During drive 2 time (that drive time associated with frame 2 of the input signal) the reference signals $e_1$ and $e_2$ are seen to be held in opposite states. It is further noted that during "quench 1" time, the signal $e_2$ is maintained at a level corresponding to that of $e_1$ and that it is only during this particular interval that the two signals $e_1$ and $e_2$ are at the same level. The levels of the voltages $e_1$ and $e_2$ might vary from, for example a minus six volts to a plus six volts and are utilized to control the conduction of the switching transistors 38 and 40 to which they are applied as gating voltages. The signal $e_1$ is applied as a gating input 39 to the base of switching transistor 38. The signal $e_2$ is applied as a gating input 41 to the base of switching transistor 40.

For purposes of explanation, the reference switching signal $e_1$ and the input signal $e_S$ are shown to be in phase. As will be later discussed, this particular phase relationship is but a special case of a number of phase relationships which might actually exist.

When the input signal $e_S$ is positive, transistor 38 is rendered conductive by reference signal $e_1$ and transistor 40 is cut off by reference signal $e_2$. The output 35 of the amplifier 42 is in phase with the input signal $e_S$, and a current thus flows into capacitor 36 as indicated by $i_1$ in FIGURE 2. On the next half cycle, the input signal $e_S$ is negative while switching transistor 38 is cut off by $e_1$, and switching transistor 40 is rendered conductive by $e_2$. Current then flows through capacitor 37 as indicated by $i_2$ in FIGURE 2. After many cycles, voltages are accumulated on capacitors 36 and 37 with polarities as indicated in FIGURE 2.

After a certain elapsed time (the conclusion of drive 1 time at time $t_1$ of FIGURE 3) transistor 38 is held in the conductive state by reference signal $e_1$ which is maintained positive. Switching transistor 37, in turn, is held in the nonconductive or open state by its reference signal $e_2$ which is maintained negative. The output voltage $e_0$ on terminal 17 of FIGURE 2 thus becomes the sum of the accumulated voltages on capacitors 36 and 37, since transistor 40 is open and transistor 38 represents a short to ground. This output voltage may be held for a certain length of time and then sampled at the time $t_2$ in FIGURE 3.

To initiate a new cycle of operation at the conclusion of frame 2, transistors 38 and 40 are rendered conductive simultaneously. This is indicated at time $t_3$ in FIGURE 3. It is noted that at this time the voltages $e_1$ and $e_2$ are both positive for an interval corresponding to the quench 1 gating waveform. When both transistors 38 and 40 are rendered conductive, a direct short is placed across the capacitors and they discharge rapidly to zero so that the output signal $e_0$ becomes zero prior to the time $t_4$ which corresponds to the beginning of a second drive 1 period.

The build-up of the output voltage $e_0$ in FIGURE 2 is represented in FIGURE 3 as occurring during the frame 1 period of time, (actually during the drive 1 period from $t_0$ to $t_1$). The build-up appears on the output as a series of increasing spikes corresponding to the half-cycle periods of time during which transistor 38 is conductive and transistor 40 is nonconductive and the output $e_0$ is equal to the sum of the voltages accumulated on capacitors 37 and 36. It is noted that during alternate half-cycle periods, the output $e_0$ is zero, since during these periods of time the switching transistor 40 is shorted.

The rate at which the output voltage $e_0$ builds up will depend upon the phase relationship between the reference voltage $e_1$ and the input signal $e_S$. The waveforms of FIGURE 3 represent a maximum build-up rate which occurs when these voltages are in phase. If $e_1$ and $e_S$ are 90° out of phase, however, no voltage will build up at all. This is seen to be true because transistor 38 would be conducting during a time when the input signal $e_S$ is positive one half the time and negative one half the time, allowing the current $i_1$ to flow in both directions through capacitor 36 and thus no charge would be accumulated. For phase angles other than 90° a net voltage will result, and its magnitude will be according to Equation 4, that is, being proportional to cos $(\theta_1-\theta_R)$.

The operation of the circuitry of FIGURE 2 has been described with the assumption that the frequency of the reference is equal that of the incoming frequency. Should the frequency of the reference be different than the frequency of the incoming signal a new effect is noted. During the drive 1 time interval $t_0$–$t_1$ the output voltage $e_0$ would no longer increase linearly, but would appear to be an envelope, sinusoidal in character, passing through zero volts at equal time intervals. If the time is chosen such that the difference frequency between the reference and input signal goes through one complete cycle during the drive time, the output voltage $e_0$ will have returned to zero potential from which it started at time $t_0$. This is illustrated as $e_{01}$ in FIGURE 3. This will be true no matter what instantaneous phase angle existed between the reference and input signals at time $t_0$. Moreover, the output voltage $e_0$ will return to zero if the time is such that exactly $n$ cycles of difference frequency occur during the drive time interval, where $n$ is any integer. In general, many frequencies may be present in the input $e_S$ if the frequency spacing is equal to the reciprocal of the drive time. Under these conditions, an output $e_0$ will be obtained only for that particular frequency which is the same as the reference frequency. It is this phenomena which defines the separation of tones in a Kineplex data transmission system as being a function of the drive time. For any given circuit as depicted in FIGURE 2, an output $e_0$ will be obtained only for that particular input frequency which is the same as the reference frequency. Multiplexing is thus no problem since a number of tones might be simultaneously applied in parallel fashion to a number of circuits such as depicted in FIGURE 2 with each circuit responding to only one tone of the composite input by having a corresponding reference frequency.

If, however, there exists nonlinear amplification in the amplifier 42 or any limiting of the input signal in the amplifying process prior to the mixing function represented by transistors 38 and 40, undesirable cross-products will be generated. It is necessary therefore to design amplifier 42 of FIGURE 2 so as to assure absolute linearity without limiting. The particular design aspects of the amplifier 42 should therefore be emphasized as being critical and we shall consider now certain design criteria related to the operating point of transistors 38 and 40 as they relate to the number of tones which may be present on a composite input signal $e_S$ such that no clipping occurs on the peaks of the applied composite.

A correct operating point for the current amplifier comprised of transistors 20 and 23 may be calculated as follows:

Given:

$T$=Integration, or drive time
$E$=Desired maximum output voltage on one storage capacitor
$C$=Value of storage capacitor
$I_p$=Peak input signal current for single tone
$I_{pc}$=Peak input signal current for composite tones
$K=I_{pc}/I_p$.

For the maximum storage voltage the reference is in phase with the incoming signal and each capacitor is charging one half period of every input cycle.

Thus, $$\frac{EC}{T}=\frac{I_p}{2\pi}\int_0^{\pi}\sin\theta d\theta=\frac{I_p}{\pi} \quad (1)$$

$$\therefore \frac{EC}{T}=\frac{I_p}{\pi}$$

but $$I_{pc}=KI_p \quad (2)$$

$$\therefore I_{pc}=\pi\frac{KEC}{T} \quad (3)$$

Assuming, for example, a composite of 17 tones;

$K=17$

If 1 volt is desired on a 0.22 microfarad capacitor (assumed value for capacitors 36 and 37) and the drive time is 18 milliseconds, $$I_{pc}=\frac{(17)(3.14)(1)(0.22\times10^{-6})}{(18\times10^{-3})}$$

$I_{pc}$=0.65 milliampere

This is the peak current that must be supplied to the current amplifier without clipping or saturation. Resistor 29 is chosen to supply the emitter 22 of transistor 19 with 1.25 milliamperes which results in a safety factor of approximately two. The values of resistors 33 and 34 and the power supply voltage must be chosen so that there remains at least minus two or three volts of bias on the collector 21 of transistor 19. Since the current amplifier is always operative under "short circuit" conditions, there will be very little A-C swing; in this case, a maximum of ±1 volt.

The peak current required of the emitter of transistor 23 is 0.13 milliamperes resulting from a one volt A-C swing across resistor 27.

The actual D.C. current supplied by resistor 30 is 1.0 ma. which is more than adequate.

The amplifier 42 must further be designed for linearity and assurance of an extremely high output impedance to present a large time constant in conjunction with capacitors 37 and 36, since the integration process must occur with optimum linearity. For this purpose, the amplifier 42 is a common base, common collector combination with positive feedback wherein use is made of the excellent stability of the current gain of the common base configuration and the excellent stability of the voltage gain of the common collector connection. This operational aspect of the amplifier 42 may be further investigated from a consideration of the A.C. equivalent circuit of the amplifier as shown in FIGURE 12.

Positive feedback via $R_1$ makes possible infinite output impedance as seen by the load $Z_L$. Two equations will be developed here, one for the voltage gain, and the other for the output impedance. Using the nomenclature of FIGURE 12 we have:

$G_V$=common collector voltage gain of $Q_2$
$G_i$=common base current gain of $Q_1$
$G_E$=voltage gain of entire circuit.

Figure 12:
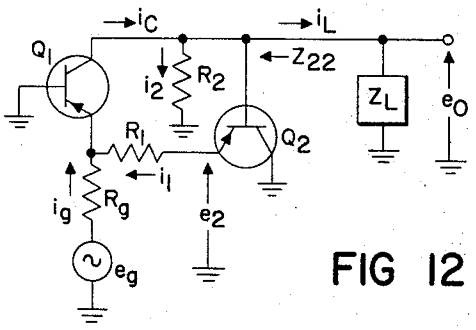
FIGURE 12 represents the A.C. equivalent circuit of the high output impedance amplifier employed in the embodiments of FIGURES 2 and 7.

The following relations are evident from FIGURE 12. It is assumed that the base current of $Q_2$ is negligible and that the emitter voltage of $Q_1$ is very much smaller than $e_2$ or $e_g$.

$$G_E=\frac{e_o}{e_g} \quad (1)$$

$$e_2=G_V e_o \quad (2)$$

$$i_1=\frac{e_2}{R_1} \quad (3)$$

$$i_c=G_i(i_g+i_1) \quad (4)$$

$$i_g=\frac{e_g}{R_g} \quad (5)$$

$$i_c=i_2+i_L \quad (6)$$

$$i_2=\frac{e_o}{R_2} \quad (7)$$

$$i_L=\frac{e_o}{Z_L} \quad (8)$$

Combining 1, 2, and 3 obtains:

$$G_E=\frac{1}{G_v}\frac{i_1R_1}{e_g} \quad (9)$$

Combining 4, 5, and 9 obtains:

$$G_E=\frac{R_1}{G_ve_g}\left(\frac{i_c}{G_i}-\frac{e_g}{R_g}\right) \quad (10)$$

Combining 6, 7, 8, and 10 obtains:

$$G_E=\frac{R_1}{G_iG_v}\cdot\frac{e_o}{e_g}\left(\frac{1}{R_2}+\frac{1}{Z_L}\right)-\frac{R_1}{G_vR_g} \quad (11)$$

But $$\frac{e_o}{e_g}=G_E$$

therefore 11 becomes:

$$G_E=\frac{G_i}{R_g}\left(\frac{1}{\frac{1}{R_2}-\frac{G_iG_v}{R_1}+\frac{1}{Z_L}}\right) \quad (12)$$

Normally, the circuit is adjusted so that:

$$\frac{1}{R_2}=\frac{G_iG_v}{R_1} \quad (12a)$$

Under these conditions 12 becomes:

$$G_E=G_i\frac{Z_L}{R_g} \quad (13)$$

Thus it is seen the voltage gain is proportional to the ratio of the load and generator impedances and to the current gain, $G_i$ of $Q_1$. Since $G_i$, which is $\propto$ of $Q_1$ transistor, is so near unity, it can be considered to be unity and 13 simplifies even more.

Note that if we have a capacitor as a load, then expressing the load in LaPlacian form:

$$Z_L=\frac{1}{SC}$$

$$\therefore G_E=\frac{G_i}{R_gC}\cdot\frac{1}{S} \quad (14)$$

Expression 14 is the LaPlacian form of a perfect integrator.

The expression for the output impedance $Z_{22}$, of the current amplifier may be obtained from the ratio of the amplifier open circuit voltage to the short circuit current. That is:

$$R_{22}=\frac{E_{oc}}{I_{sc}} \quad (15)$$

Setting $Z_L=\infty$ in 12 we obtain $$G_E=\frac{e_o}{e_g}=\frac{G_i}{R_g}\left(\frac{1}{\frac{1}{R_2}-\frac{G_iG_v}{R_1}}\right)\therefore e_{oc}=\frac{G_ie_g}{R_g}\left(\frac{1}{\frac{1}{R_2}-\frac{G_iG_v}{R_1}}\right) \quad (16)$$

Setting $Z_L=0$, we see that $$i_c=G_ii_g=G_i\frac{e_g}{R_g}=I_{sc} \quad (17)$$

Combining 15, 16, and 17 obtains $$R_{22}=\frac{1}{\frac{1}{R_2}-\frac{G_iG_v}{R_1}} \quad (18)$$

As previously stated, $1/R_2$ is adjusted to equal $(G_iG_v)/R_1$, therefore the output impedance is infinitely large.

Note in the amplifier schematic of FIGURE 2 that a potentiometer 34 is included so that the equality 12*a* may be satisfied to a high degree of accuracy. Experimentally, and also theoretically, it has been shown that very little degradation is suffered if this equality has not been satisfied exactly. This allows the potentiometer to be replaced with precision resistors in the collector and emitter circuits (Resistors 27, 33 and 34 of FIGURE 2).

The following is a derivation of the output impedance of amplifier 42 as a function of the deviation of $R_1$ and $R_2$ of FIGURE 12 from the ideal.

Equation 18 may be rewritten in terms of an output conductance as follows:

$$Y_{22}=\frac{1}{R_2}-\frac{G_iG_v}{R_1} \quad (19)$$

$Y_{22}$ should ideally be equal to zero.

If $R_{22}$ changes by $\Delta R_{22}$ and $R_1$ changes by $\Delta R_1$ then $Y_{22}$ will change by some $\Delta Y_{22}$. That is:

$$Y_{22}+\Delta Y_{22}=\frac{1}{R_2+\Delta R_2}-\frac{G_iG_v}{R_1+\Delta R_1} \quad (20)$$

But for $\Delta R_1 \ll R_1$ and $\Delta R_2 \ll R_2$, $$\frac{1}{R_2+\Delta R_2}\cong\frac{1-\frac{\Delta R_2}{R_2}}{R_2} \text{ and } \frac{1}{R_1+\Delta R_1}=\frac{1-\frac{\Delta R_1}{R_1}}{R_1}$$

The above is true since;

$$\frac{1}{1+X}=1-X+\frac{2}{2!}X^2-\frac{2.4}{3!}X^3+\frac{2.4.6.}{4!}X^4-\ldots$$

$$Y_{22}+\Delta Y_{22}=\frac{1}{R_2}-\frac{\Delta R_2}{R_2^2}-\frac{G_iG_v}{R_1}+\frac{G_iG_v\Delta R_1}{R_1^2} \quad (21)$$

Equation 20 therefore becomes;

$$\therefore \Delta Y_{22}=\frac{G_iG_v}{R_1^2}-\frac{\Delta R_2}{R_2^2} \quad (21a)$$

Assuming $G_iG_v\cong1$ and $R_1\cong R_2$, Equation 21*a* may be further simplified to:

$$\Delta Y_{22}=\frac{1}{R^2}(\Delta R_1-\Delta R_2) \quad (22)$$

As an example of what may be obtained with one percent resistors, assume $R_2$ is one percent less than 10000 ohms and $R_1$ is one percent more than 10000 ohms. Equation 22 shows that the output impedance is still one half megohm.

Ideally, switching transistors 38 and 40 of FIGURE 2 should be perfect switches. When these switching transistors are turned on there should be no offset voltage and they should offer zero resistance in the emitter-collector path. When turned off, there should be no leakage current; that is, they should present infinite impedance in the emitter-collector path. In a particular embodiment of FIGURE 2 which was caused to be constructed, type 2N2432 transistors were found to approach this perfection if driven properly and used in the inverted connection. This type of transistor, if turned on with approximately one milliampere, presents an open circuit voltage of less than one millivolt (looking into the emitter with collector grounded) and the resistance is approximately 20 ohms. When cut off (for example, by the base being held at −6 volts with respect to grounded collector), the emitter leakage current is in the order of two nanoamps at room temperature.

The previously enumerated requirements that there must be no D.C. off-sets and that the circuitry must hold the integral data without change, may thus be met by proper choice of switching transistors 38 and 40.

The basic circuit embodiment in FIGURE 2 is thus seen to be quite simple. However, the number of this type of circuit required to completely demodulate an incoming signal should be considered. The required number is determined in part by the type of modulation used. In the Kineplex data transmission technique under consideration here, a differential phase-pulse coding scheme is employed where the binary information is contained in the difference of the phase of a tone from one frame to the next. Since a phasor must be defined by two quantities (either the magnitude and phase angle, or the real and the imaginary parts), two storage elements are necessary for ascertaining the tone phase for one frame and two for the following frame for this type of modulation. By comparing these four quantities at a particular instant in time (sample time), the determination of the phase difference from frame to frame can be made. The circuitry of FIGURE 2 must thus be employed four times to demodulate a single differentially phase coded tone.

Figure 6:
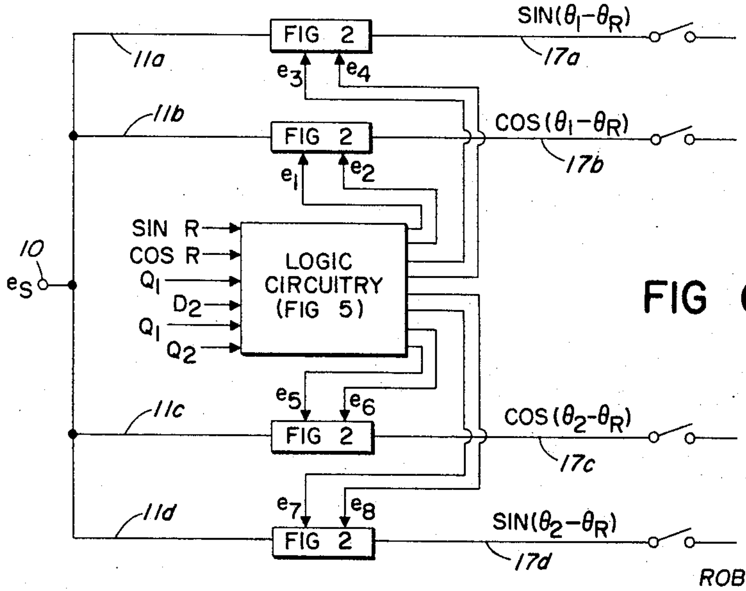
FIGURE 6 is a functional diagram of the dual employment of the circuitry embodied in FIGURE 2 in a complete Kineplex demodulating system.

FIGURE 6 represents functionally the employment of four circuits of the type shown in FIGURE 2 into a system wherein the input signal $e_S$ is applied in common to all four FIGURE 2 embodiments. The reference signal controlling the switching of transistors 38 and 40 takes the form of pairs of signals $e_1$–$e_2$, $e_3$–$e_4$, $e_5$–$e_6$ and $e_7$–$e_8$. These pairs of reference signals are synthesized from quadraturized reference signals, sin R and cos R, which are applied to appropriate logic circuitry along with Kineplex timing waveforms drive 1, drive 2, quench 1 and quench 2. Each of the mixing-integrating circuits per FIGURE 2 develops an output proportional to the sine or cosine function of the difference in phase between the incoming signal $e_S$ during a frame and that of the reference. The outputs 17*a*–17*d* thus represent the four necessary quantities from which the tone phase shift between successive frames may be determined. Similar to the technique described in the above referenced copending application, the upper channel pair of FIGURE 2 embodiments receive reference signals pairs based on the sine and cosine respectively of the reference frequency during frame 1 period of time and develop respective outputs proportional to the sine and cosine of the difference in phase between the incoming signal during frame 1 and that of the reference.

Two additional mixing and integrating circuits in accordance with FIGURE 2 receive reference signal pairs based on the sine and cosine of the reference frequency during frame 2 period of time and develops outputs proportional respectively to the sine and cosine of the difference in phase between the incoming signal during frame 2 and that of the reference. These four output quantities thus contain the necessary information to determine the phase relationship between each frame of incoming signal and that of the preceding frame in accordance with Kineplex demodulation techniques.

Note that FIGURE 6 shows reference signals $e_1$ and $e_2$ being applied to a FIGURE 2 configuration to develop an output 17*b* proportional to cos $(\theta_1-\theta_R)$. This particular portion of the over-all form correlates with the basic operation illustrated in FIGURE 1 and the waveform analysis of FIGURE 3. It is noted that others of the FIGURE 2 circuits embodied in the system of FIGURE 6 receive further pairs of reference signals. Each of these additional signal pairs effects a switching technique within the associated FIGURE 2 blocks identical to that previously described, but occurring at different times.

Figure 4:
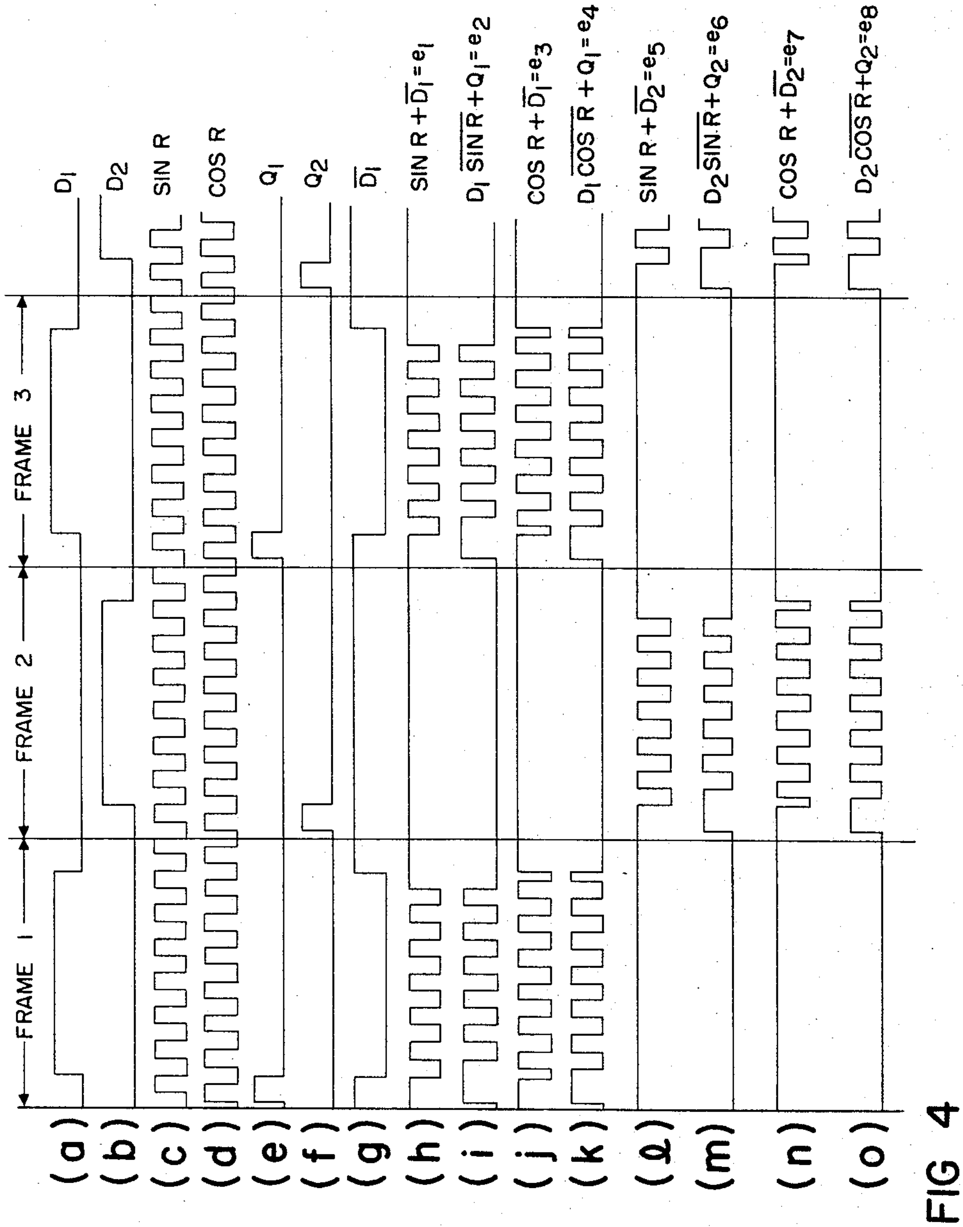
FIGURE 4 represents the synthesis of operational waveforms for use in the single embodiment of FIGURE 2 and multiple embodiments thereof.
Figure 5:
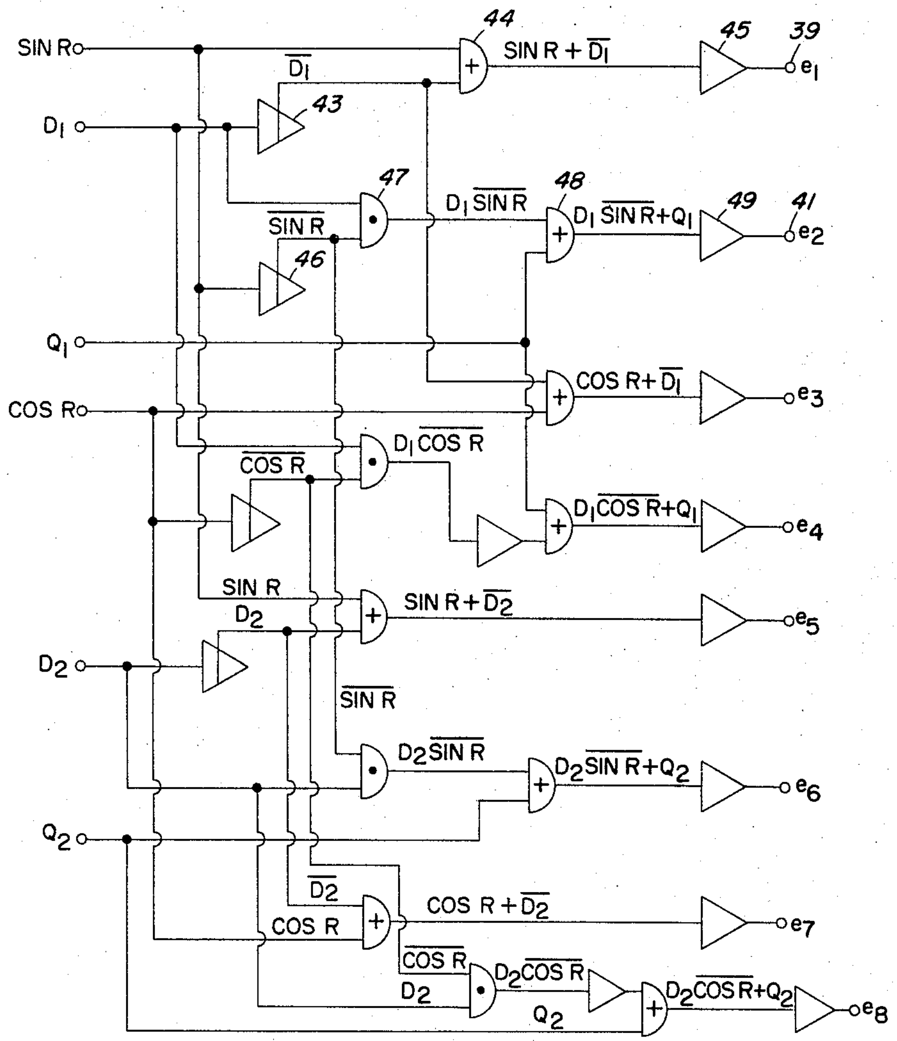
FIGURE 5 is a logic diagram illustrating the development of waveforms of FIGURE 4 from timing waveforms peculiar to a Kineplex data transmission system.

Reference is made to FIGURE 4 which illustrates overall operational waveforms which are utilized in the embodiment of FIGURE 6. The logic circuitry of FIGURE 6 produces eight outputs in the form of pairs of switching signals. These outputs signals are synthesized or formulated by certain operations on input signals sin R, cos R, $D_1$, $D_2$, $Q_1$ and $Q_2$, which are basic system timing waveforms associated with a Kineplex demodulating system. Sine R and cos R refer to quadraturized square waves with periodicy and phase determined by the reference frequency. $D_1$ and $D_2$ refer respectively to drive time 1 and drive time 2 gating waveforms which are developed in synchronism with the frame repetition rate of the incoming signal. $Q_1$ and $Q_2$ refer to quenching waveforms. Waveform $Q_1$ is generated synchronously for a predetermined period preceding the time occurrence of the drive 1 waveform in odd frames. Waveform $Q_2$ is developed for a like predetermined time interval preceding the time occurrence of the drive 2 waveforms during even frames. From these input waveforms, which might be developed in a synchronous time-based generator in a Kineplex receiving system, logic circuitry such as depicted in FIGURE 5 may be formulated from Boolean algebra techniques to produce the reference gating waveforms $e_1$ through $e_8$. FIGURE 5 represents but one of a number of logic switching embodiments from which the waveforms may be formulated. Considering, for example, the reference waveform pair $e_1$–$e_2$, and referring to FIGURE 4, it is noted that these waveforms are complementary waveforms phased in accordance with sine R during the drive 1 interval in odd frames. The switching transistors 38 and 40 are thus alternately gated on and off at the sine R reference rate during the drive 1 intervals. The necessary integration reset function is accomplished by causing reference waveforms $e_1$ and $e_2$ to both be positive during that portion of time corresponding to the quench waveform $Q_1$, such that both transistors 38 and 40 conduct simultaneously for this period of time to accomplish a discharge of capacitors 36 and 37. The waveforms $e_1$ and $e_2$ thus become complex waveforms and are not arrived at by merely gating on and off the sine R reference.

FIGURE 5 illustrates a manner in which the necessary forms of waveforms $e_1$ and $e_2$ may be synthesized through logic switching by utilizing the input waveforms sine R, $D_1$, and $Q_1$. The waveform sine R may be applied to an OR gate 44 along with the inverted form of waveform $D_1$ from inverter 43 to produce waveform sine $R+\overline{D_1}$. This output may be applied through an emitter-follower 45 to produce an output 39 corresponding to the desired waveform. The companion waveform $e_2$ is in the form $D_1\ \overline{\text{sine}\ R}+Q_1$. Thus the sine R input may be inverted through inverter 46 to produce sine $\overline{\text{R}}$ and combined with $D_1$ in AND gate 47. The output from AND gate 47 may be combined with $Q_1$ waveform in OR gate 48 to produce the desired waveform. The development of waveforms $e_1$ and $e_2$ is shown graphically in FIGURE 4.

Using similar Boolean algebra techniques, the waveform pair $e_3$–$e_4$ is generated as complementary waveforms corresponding to cos R during odd frame drive times and are likewise caused to be simultaneously positive during those periods of time corresponding to the quench 1 waveform.

The waveform pairs $e_5$–$e_6$ and $e_7$–$e_8$ are developed in a similar manner based on sine and cosine functions of the reference frequency but occurring during even frames with a given pair being simultaneously positive only during those periods of time corresponding to the quench 2 waveform.

The logic circuitry of FIGURE 5, operating on the Kineplex input timing signals, is thus seen to develop pairs of switching waveforms based on the sine and cosine functions of the reference frequency R to provide a system switching control utilizing the mixer-integrator circuitry of FIG. 2. During frame 1 period of time the upper pair of mixer-integrators in FIG. 6 receives the switching waveforms $e_1$–$e_2$ and $e_3$–$e_4$ to produce respective outputs proportional to the cosine and sine functions of the phase difference between the incoming signal $e_S$ and the reference signal R. The outputs are held during the succeeding frame 2, during which time the lower pair of mixer-integrator circuits, under the control of reference switching waveform pairs $e_5$–$e_6$ and $e_7$–$e_8$, develop respective outputs proportional to the sine and cosine of the difference in phase between the incoming signal $e_S$ during the frame 2 and the reference signal R. Outputs 17*c* and 17*d* are held during a frame 3 period during which time an integration function is repeated and a further determination made in the upper channel of FIGURE 6.

The discussion with reference to FIGURE 6 has shown that four circuits of the type illustrated in FIGURE 2 may be utilized to demodulate a single Kineplex tone. Since the Kineplex data transmission system normally empolys a plurality of, for example, twenty tones, a complete system would actually require twenty versions of that depicted in FIGURE 6, each differing in having reference switching signal pairs, such as $e_3$–$e_4$, etc., corresponding in frequency to one of the multiple of tones in the composite input. Discussion pertaining to the tone separation technique used in a Kineplex system bore out the fact that the various demodulation channels may operate in parallel from a common composite input signal line, each being responsive only to that one of the tones in the input signal $e_S$ which corresponds in frequency to its channel reference frequency.

Since a typical Kineplex system then would require a multiple employment of the basic circuit such as has been described thus far, a further embodiment of a basic mixing and integrating circuitry will be considered which differs only slightly from that depicted in FIGURE 2, but which permits a unique time sharing of the high output impedance amplifier 42, such that only two circuits are required to demodulate a tone as compared to four of the circuits of FIGURE 2. The net saving concerning each tone in the input amounts to six transistors and four capacitors. This appreciable saving in component cost, from a system standpoint, is offset only by the slight disadvantage of a small decrease in the signal-to-noise ratio obtainable since, as will be borne out in further discussion, a "half wave" sample wave technique is used as compared to a "full wave" technique in the FIGURE 2 embodiment.

Figure 7:
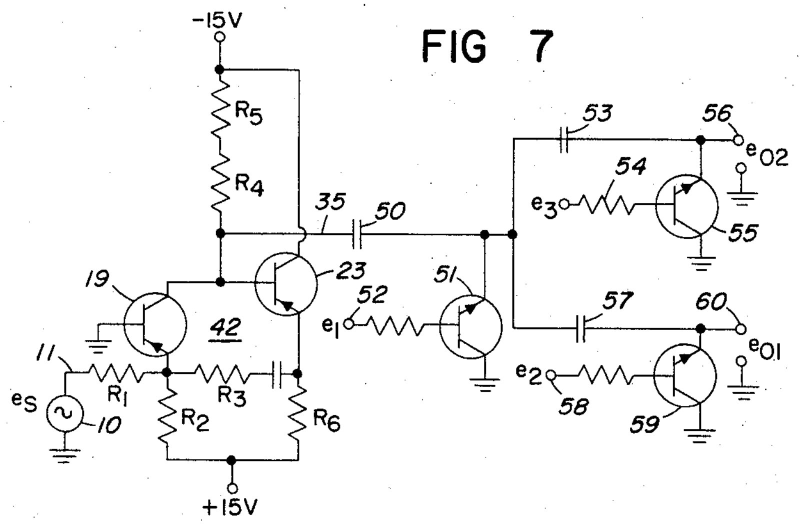
FIGURE 7 is a schematic embodiment of a half-wave embodiment of the detecting and integrating circuitry of the invention.

Reference is made to the half wave correlator circuit illustrated schematically in FIGURE 7. The input signal $e_S$ is applied as before to the high output impedance amplifier 42. The amplifier output 35 is applied to a transistor switching and capacitor integrating network. The savings in circuitry is made possible by a unique time sharing of high output amplifier 42. Note that the embodiment of FIGURE 7 differs schematically from that of FIGURE 2 by the addition of a series capacitor 50 in the output of the amplifier 42 and the addition of a third switching transistor 51 whose emitter-collector path shunts the two output switching transistor networks. The circuit of FIGURE 7 requires a third reference switching signal and the operational sequence involves the relative conductivity states of transistors 51, 59, and 55 as controlled by reference switching signals $e_1$, $e_2$, and $e_3$, respectively.

The output 35 from amplifier 42 is applied through capacitor 50 to the emitter of transistor 51 and to first terminals of integrating capacitors 57 and 53. The second terminals of the capacitors 57 and 53 are returned to ground through the emitter-collector paths of the associated transistors 59 and 55, respectively. The relative conductivity of the three switching transistors is controlled by a reference signal $e_1$ applied to terminal 52 to control the operation of transistor 51; by a reference signal $e_2$ applied to the terminal 58 to control the operation of transistor 59; and by a reference signal $e_3$ applied to terminal 54 to control the operation of transistor 55. A first output $e_{01}$ is taken from the emitter of transistor 59 to common ground. A second output $e_{02}$ is taken from the emitter of transistor 55 to common ground.

The operation of the circuit of FIGURE 7 bears a distinct similarity to that of FIGURE 2 but includes peculiar differences which make possible its unique amplifier time-sharing feature.

Operational waveforms for the embodiment of FIGURE 7 are shown in FIGURE 8 as they might occur during three successive frames. FIGURE 8 illustrates the relationship of the drive time within each frame, the quench time within each frame, and the sample time within each frame. The input signal $e_S$ is illustrated as a sine wave and, for simplicity, only a few cycles have been illustrated for each frame, it being understood that normally about four hundred cycles would occur during the period of a frame. Additionally, for simplicity, the input signal $e_S$ is shown without phase shift between successive frames and it is to be understood that normally an odd multiple of 45° phase shifts would occur instantaneously at the end of the frame period.

Each of the reference signals ($e_1$, $e_2$, $e_3$) might vary, for example, from minus six volts to plus six volts about a zero or ground reference. Thus, during frame 1, transistor 55 is held open or nonconductive by $e_3$, while the push-pull application of signals $e_1$ and $e_2$ causes transistors 51 and 59 to be alternately conductive. The first half cycle of $e_1$ occurring during frame 1 drive time is seen to be negative when the input signal $e_S$ is negative. The first half cycle of $e_2$ is seen to be positive when $e_S$ is negative and thus, during this period, transistor 59 is rendered conductive while transistor 51 is open. The output voltage $e_{01}$ is is thus zero since transistor 59 represents a direct short to ground. Capacitor 57 charges with the polarity shown. The output voltage $e_{02}$ is represented by the voltage on capacitor 53 minus the voltage on capacitor 57. The assumption is here made that the capacitor 53, during frame 1, has stored thereon a charge accumulated during a preceding frame.

The second half cycle of $e_1$–$e_2$ during the drive time of frame 1 causes a reversal in the conductivity states of transistors 51 and 59 such that transistor 51 is shorted and transistor 59 is open. The output $e_{01}$ is the value of the charge on capacitor 57 for this interval since transistor 51 is shorted to ground and the voltage from the output terminal 60 to ground is that existing across capacitor 57. During this same interval, the output $e_{02}$ is the full value of the charge stored on capacitor 53 since the voltage between terminal 56 and ground is the voltage across capacitor 53. This push-pull operation continues during frame 1 and the output $e_{01}$ is represented as a series of half wave "samples" the magnitudes of which are determined by the linear increasing voltage accumulation on capacitor 57. During frame 1, the charge on capacitor 53 remains at a constant magnitude. The output $e_{02}$ reflects this constant value modified by a superimposed A.C. component corresponding to the voltage on capacitor 57. The output $e_{01}$ might then be defined during frame 1 as alternately being zero and the voltage across capacitor 57 while the output $e_{02}$ is alternately the difference between the voltages on the capacitors 53 and 57 and the full stored value of the voltage on capacitor 53. It is to be noted that at the end of frame 1, during the time when the sample is taken, the switching signal $e_1$ is positive so as to short the transistor 51 thus allowing the voltages on capacitors 57 and 53 to be sampled independently.

At the beinnging of frame 2, during the time corresponding to the quench 2 period, the voltage on capacitor 53 is dumped so as to reset the capacitor for a subsequent integrating function during frame 2. This reset is accomplished by the switching waveforms $e_1$ and $e_3$ both being positive during the $Q_2$ interval so as to short both transistors 51 and 53 and thus place a direct short across capacitor 53.

Now considering the operation in frame 2, a similar situation exists with the exception that transistor 59 is held off during the entire period by its switching signal $e_2$ being held negative during this period of time. The push-pull action during frame 2 now exists between transistors 51 and 55 with switching signals $e_1$ and $e_3$ being complementary during this period. During the first half cycle of drive time in frame 2, transistor 55 is open and transistor 51 is shorted such that $e_{01}$ is the stored voltage on capacitor 57 while output $e_{02}$ is the voltage building up on capacitor 53. During the second half cycle during drive time in frame 2, transistor 55 is shorted while transistor 51 is open, and the output $e_{01}$ is the voltage across capacitor 57 less the voltage across capacitor 53, while the output $e_{02}$ is zero. The push-pull operation continues as before throughtout frame 2.

At the beginning of frame 3, the stored charge on capacitor 57 is dumped by a reset action effected by $e_2$ and $e_1$ both being positive and shorting transistors 51 and 59 to place a direct short across capacitor 57. Subsequent action during frame 3 then repeats the process described with respect to frame 1.

A study of the waveforms of FIGURE 8 shows that capacitor 57 is quenched and charged during odd frames and maintains its charge in even frames. The opposite is true for capacitor 53. Both voltages are sampled every frame, however; therefore, the same D.C. voltage is always sampled twice. The first time it is sampled it is being used to determine the phase of the "present" frame, and the second time it is sampled it acts as a reference for the "past" frame.

It is to be noted that the reference switching waveforms $e_1$, $e_2$, and $e_3$ as shown in FIGURE 8 represent an in-phase relationship or complementary phase relationship with respect to the input signal $e_S$ during drive time periods. If then, the input signal were defined as sine $(\omega_1 t+\theta)$, the reference switching signals would represent sine and sine-complement functions of $(\omega_1 t+\theta_R)$. The outputs $e_{01}$ and $e_{02}$ would then correspond to the cosine functions of $(\theta_1-\theta_R)$ and $(\theta_2-\theta_R)$, respectively. A phase determination is thus made in the form of cosine functions of the difference in phase between the input signal during successive frames and the phase of the reference source. Since, as above described, four quantities are necessary to define a phasor, a second circuit identical to that of FIGURE 7 is employed in a system arrangement operating in conjunction with a second group of reference switching signals $e_4$, $e_5$ and $e_6$ with the latter being based on cosine and cosine-complement relationships as regards the reference frequency, it being understood that the reference signal R in the system will be quadrature in nature (sine R and cos R).

Figure 11:
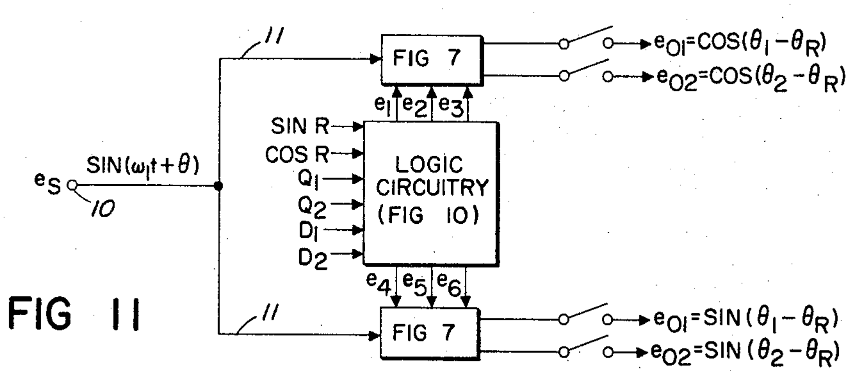
FIGURE 11 is a functional diagram of the multiple embodiment of the circuitry of FIGURE 7 in a complete Kineplex demultiplexing and demodulating system.
Figure 9:
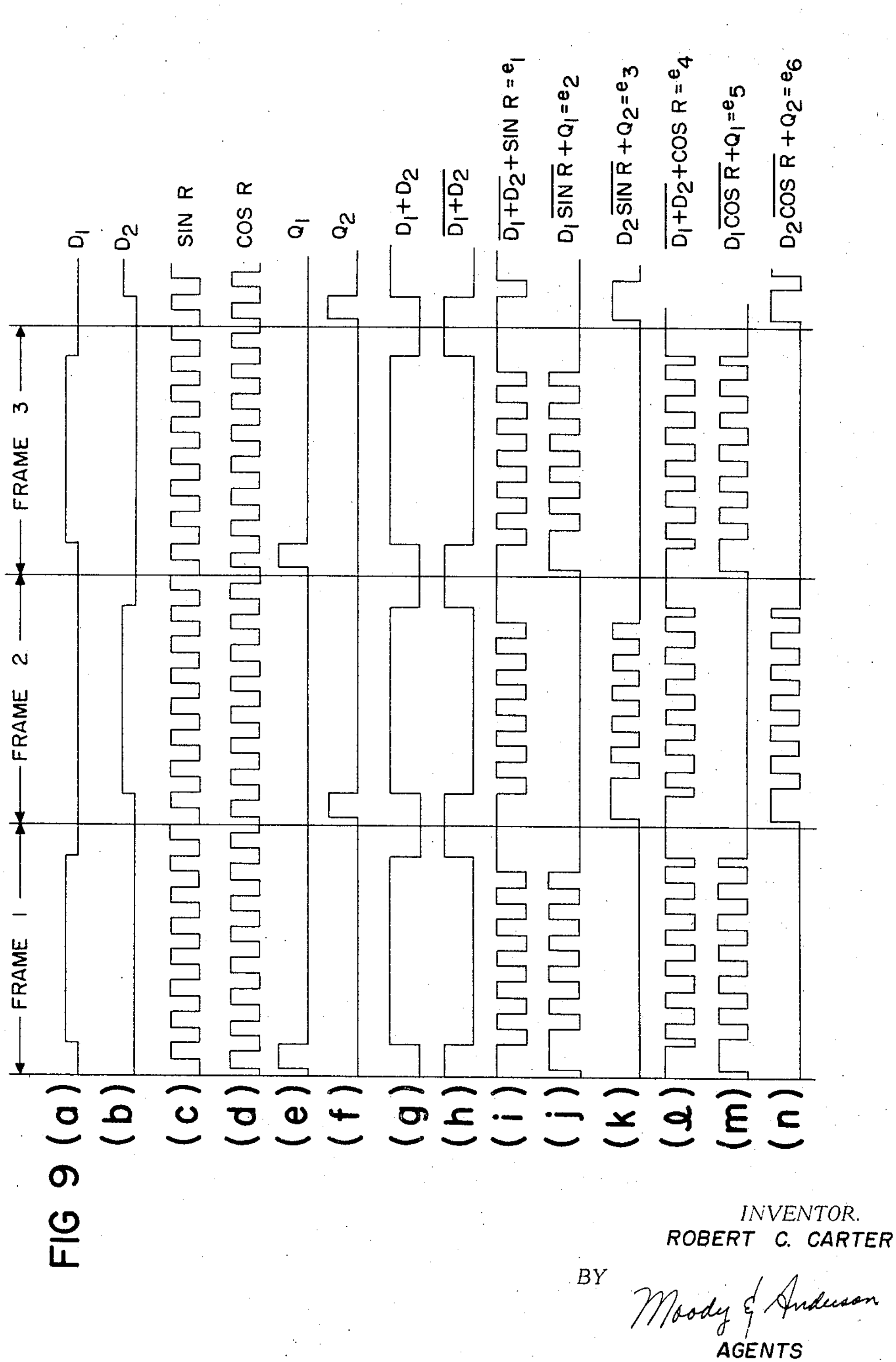
FIGURE 9 illustrates the synthesis of operational waveforms for use in the single embodiment of FIGURE 7 and multiple embodiments thereof.

A system approach based on the FIGURE 7 embodiment is illustrated in FIGURE 11 wherein a composite input signal 10 is applied as input to a pair of circuits. The upper circuit develops outputs $e_{01}$ and $e_{02}$ corresponding to the cosine functions between successive frame phases and the reference, with the lower circuit developing outputs $e_{01}$ and $e_{02}$ corresponding to the sine functions of these phase relationships. A logic circuitry receives Kineplex system timing signals in the form of sine R, cosine R, $Q_1$, $Q_2$, $D_1$ and $D_2$ to develop the two sets of reference switching signals. The logic circuitry might be that illustrated in FIGURE 10. Over-all operational waveforms are illustrated in FIGURE 9.

Figure 10:
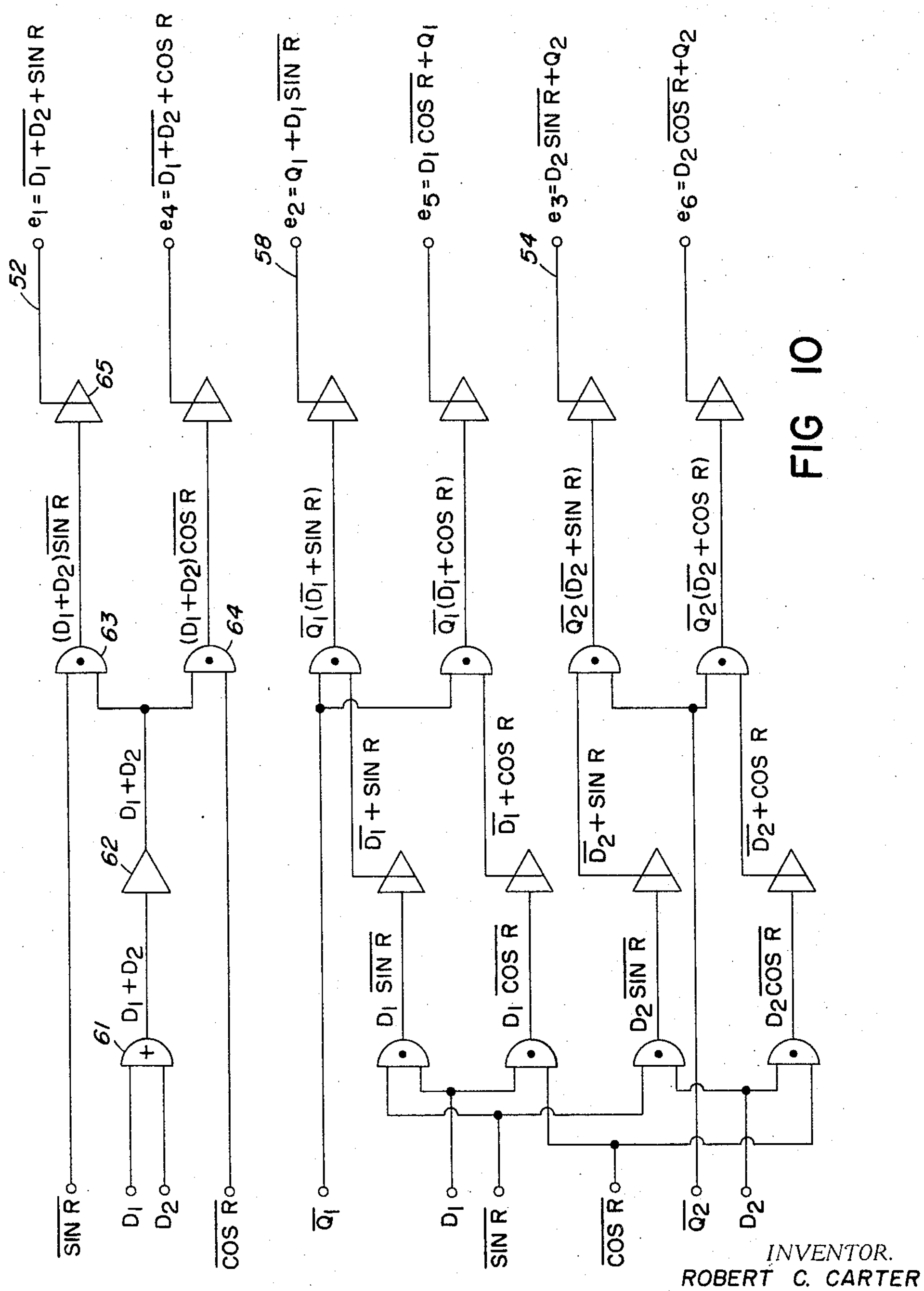
FIGURE 10 is a logic diagram illustrating the development of the waveforms of FIGURE 9 from timing waveforms peculiar to a Kineplex data transmission system.

The development of the reference switching signals $e_1$, $e_2$ and $e_3$ may stem from a synthesis process employing Boolean algebra techniques wherein the Kineplex timing waveforms and/or their complements are applied to certain permutations of OR and AND gates with outputs manipulated through appropriate inverters to arrive at the desired waveforms. For example, FIGURE 10 represents the reference switching waveform $e_1$ as being the complemented sum of the drive 1 and drive 2 waveforms added in turn to the sine R waveform. This is accomplished through OR gate 61, emitter-follower 62, AND gate 63 and inverter 65. Reference signals $e_2$ and $e_3$ are similarly synthesized from the input timing waveforms and appropriate logic circuitry.

The waveforms $e_4$, $e_5$, and $e_6$ which control the lower channel portion of the system embodiment of FIGURE 11, are seen to be developed in a similar fashion using cosine and cosine-complement reference signal inputs. It is noted that $e_1$ and $e_4$ are similar in every respect with the exception that the portion of the waveform occurring during drive time is based in the first instance on sine R and in the second instance on cos R. A similar correlation is seen between $e_2$ and $e_5$, and between $e_3$ and $e_6$.

The embodiment of FIGURE 7 is thus seen to lend itself to a reduction in the number of such basic circuits required to completely demodulate a single Kineplex tone. Either of the embodiments of FIGURES 2 or 7 provides a relatively simple mixing-integrating function using a purely electronic approach such that, from a system inventory standpoint, but one basic circuit is required, with this single circuit being used repetitively in a system to demultiplex and demodulate the composite input signal.

Although the invention has been described with respect to particular embodiments thereof, it is not to be so limited. The invention has been described with particular emphasis on its application to Kineplex data transmission systems. It is contemplated, however, that the basic circuits might be utilized in other applications requiring synchronous demodulation under conditions of poor signal-to-noise ratio.

I claim:

1. A circuit for mixing a first signal of the frequency $\omega_1 t$ and phase $\theta$ with a second signal of frequency $\omega_1 t$ and $\theta_R$ and developing therefrom an output proportional to the integral of the D.C. component of the product of said first and second signals over a predetermined interval of time T where $\omega_1 T$ is much greater than unity; comprising amplifier means having essentially infinite output impedance to which said first signal is applied as an input, the output of said amplifier means being connected serially through a first capacitor and a first switching means to common ground, the output of said amplifier being additionally connected serially through a second capacitor and a second switching means to common ground, means for alternately closing each of said first and second switching means for predetermined time intervals corresponding to half cycle periods of time at the frequency $\omega_1 t$, an output taken across said second switching means, said output being equal to the charge across said first and second capacitors at a period of the time when said second switching means is open and said first switching means is closed, and being proportional to the integral of the D.C. component of the products of said first and second input signals at the end of said period of time T.

2. Circuitry as defined in claim 1 wherein said first signal is comprised of synchronous intervals of duration T each successive interval of which bears a predetermined phase shift relationship with the preceding interval, and means for simultaneously causing said first and second switching means to be closed for a predetermined interval of time at the beginning of alternate ones of said input intervals to discharge said first and second capacitors whereby said output signal is reset to zero.

3. Circuitry as defined in claim 2 wherein said first and second switching means are held respectively closed and open for the time duration of those input signal intervals intermediate said alternate intervals whereby the output during said intervening intervals is held at a value corresponding to the integral of the D.C. component of the product of said first and second signals for the period of time T corresponding to the preceding one of said input signal intervals.

4. Circuitry as defined in claim 3 further including means to sample said output signal for a predetermined period of time during those last half cycle portions of the alternate ones of said input intervals during which said second switching means is open and said first switching means is closed.

5. Circuitry as defined in claim 4 wherein said first and second input signals are in the form of sin $(\omega_1 t+\theta_1)$ and cos $(\omega_1 t+\theta_R)$ respectively and said output signal is proportional to sin $(\theta_1-\theta_R)$.

6. Circuitry as defined in claim 5 wherein said first and second input signals are in the form of sin $(\omega_1 t+\theta_1)$ and sin $(\omega_1 t+\theta_R)$ respectively and the output signal is proportional to cos $(\theta_1-\theta_R)$.

7. Circuitry as defined in claim 1 further including means for causing each of said switching means to be simultaneously closed for a period of time at the beginning of each period of time T and means for causing said first and second switching means to be respectively held closed and open for an ensuing period of time T, an output taken across said second switching means, and means to sample said output for a predetermined period of time preceding the end of each period of time T.

8. Circuitry as defined in claim 7 wherein said first and second switching means comprise transistors the emitter-collector junctions of which are respectively serially connected between the associated ones of said first and second capacitors and common ground, switching control means comprising gating waveforms in the form of a pair of complementary square waves at the frequency $\omega_1 t$, and phase $\theta_R$, said complementary square waves being applied respectively to the bases of said first and second transistors to alternately render said transistors conductive to effect charging of said first and second capacitors, said waveforms being simultaneously held at a like predetermined polarity to render said transistors simultaneously conductive during those predetermined intervals of time at the beginning of alternate ones of said input intervals, said waveforms being respectively held at opposite polarities for the duration of those intervals preceding the end of alternate ones of said input intervals so as to render said first transistor conductive and said second transistor nonconductive during these time periods.

9. Circuitry as defined in claim 8 wherein said first signal is defined as sin $(\omega t+\theta_1)$ and said first and second control switching signals are defined respectively as sine and sine-complement functions of said second signal, said output signal being proportional to cos $(\theta_1-\theta_R)$.

10. Circuitry as defined in claim 8 wherein said first signal is defined as sin $(\omega_1 t+\theta_1)$ and said switching control signals are in the form of cosine and cosine-complement functions of said second signal, whereby said output signal at the end of the intervals of time T during which said transistors are rendered alternately conductive is proportional to sine $(\theta_1-\theta_R)$.

11. Means for demodulating an input signal in the form of synchronous intervals of a frequency $\omega_1 t$ and phase $\theta$ wherein successive ones of said intervals bear a predetermined phase relationship with the preceding one of said intervals to develop four output quantities, a first pair of said quantities being proportional respectively to sin $(\theta_1-\theta_R)$ and cos $(\theta_1-\theta_R)$, a second pair of said quantities being proportional respectively to sin $(\theta_2-\theta_R)$ cos $(\theta_2-\theta_R)$, where $\theta_R$ is the phase of a reference frequency R and $\theta_1$ and $\theta_2$ represent the respective phases of successive ones of said input signal intervals; comprising first, second, third and fourth signal mixing and integrating means to which said input signal is simultaneously applied; each of said signal mixing and integrating means comprising an amplifier having essentially infinite output impedance to which said input signal is applied, the output of the said amplifier being connected serially through a first capacitor and a first switching means to common ground, the output of said amplifier being additionally connected serially through a second capacitor and second switching means to common ground, an output being taken across said second switching means, switching control means connected to the first and second switching means associated with each of said first, second, third and fourth signal mixing and integrating means, said switching control means being connected to said first and second ones of said signal mixing and integrating means to effect alternate closing of the first and second switching means associated therewith at a time rate based on the cosine and cosine-complement functions of said reference signal R during first and alternate ones of said input signal intervals, said switching means effecting alternate closing of first and second switches associated with said second signal mixing and integrating means at a rate defined by the sine and sine-complement functions of said reference signal R during first and alternate ones of said input signal intervals, said switching control means being connected to said third signal mixing and integrating means to effect alternate closing of the first and second switching means associated therewith during second and alternate input signal intervals at a rate defined by sine and sine-complement functions of said reference signal, said switching control means connected to and effecting alternate closing of the first and second switching means associated with said fourth signal mixing and integrating means during second and alternate input signal intervals at a rate defined by the cosine and cosine-complement functions of said reference signal, said switching control means further including means to effect the simultaneous closing of the switching means associated with said first and second signal mixing and integrating means for a predetermined period of time at the beginning of said first and alternate input signal intervals and to render said first switching means closed and said second switching means open for second and alternate ones of said input signal interval; and means for sampling the outputs from said first, second, third and fourth mixing and integrating means for a predetermined period of time preceding the end of each one of said input signal intervals.

12. A system as defined in claim 11 wherein the first and second switching means associated with each of said first, second, third and fourth mixing and integrating means each comprise a transistor the emitter-collector junction of which is serially connected between an associated one of said first and second capacitors and common ground and wherein said switching control means comprises complementary pairs of square waves having frequency and phase determined by the aforedefined quadrature functions of the reference signal R.

13. A circuit for mixing a first signal of the form sin $(\omega_1 t+\theta)$ with a second signal of the form $(\omega_1 t+\theta_R)$, said first signal being comprised of synchronous intervals each having a predetermined phase relationship to the preceding one of said intervals, wherein successive ones of said intervals may be defined as sin $(\omega_1 t+\theta_1)$ and sin $(\omega_1 t+\theta_2)$ respectively, means for developing first and second output signals proportional respectively to the difference in phase between a given input signal interval and the succeeding one of said input intervals, said outputs being defined respectively as sinusoidal functions of $(\theta_1-\theta_R)$ and $(\theta_2-\theta_R)$ respectively; comprising an amplifier having essentially infinite output impedance to which said input signal is applied, the output of said amplifier being applied serially through a first capacitor and a first switching means respectively to common ground, a second capacitor and second switching means being respectively serially interconnected with the series interconnection thereof being shunted by said first switching means, a third capacitor and third switching means respectively serially interconnected with the series interconnection thereof shunting said first switching means, said first output being taken across said second switching means, said second output being taken across said third switching means, and switching control means connected to said first, second and third switching means whereby said first, second and third switching means may be opened and closed in a predetermined manner, said switching control means during alternate ones of said input signal intervals effecting alternate closing of said first and third switching means at a rate defined by a sinusoidal function of the reference signal R while holding said second switching means open, and during intervening ones of said intput signal intervals effecting alternate closing of said first and second switching means at said sinusoidal function of the reference signal R while holding said third switching means open, said switching control means further comprising means to simultaneously close said first and third switches for a predetermined period of time at the beginning of said alternate input signal intervals during which said first and third switches are alternately closed; said switching control means further comprising means to simultaneously close said first and second switches for a predetermined period of time at the beginning of said intervening input signal intervals during which time said first and second switching means are alternately closed; and means for sampling said first and second outputs for a predetermined time interval at the end of each successive input signal interval and during a period of time when said first switching means is closed and one of said second and third switching means is open.

14. A circuit as defined in claim 13 wherein said first, second and third switching means comprise transistors the emitter-collector junctions of which are serially connected between the associated ones of said capacitors and said common ground, and said switching control means comprises means for generating gating waveforms in the form of complementary square waves with periodicity defined by said reference frequency during those intervals when alternate switching is effected between pairs of said first, second and third transistors; said waveforms being held at a polarity to render pairs of said transistors simultaneously conductive during those predetermined intervals of time during which pairs of said switching means are closed.

15. Means for demodulating an input signal in the form of synchronous intervals of a frequency $\omega_1 t$ and phase $\theta$ wherein successive ones of said intervals bear a predetermined phase relationship with the preceding one of said intervals to develop four output quantities, a first pair of said quantities being proportional respectively to sin $(\theta_1—\theta_R)$ and sin $(\theta_2—\theta_R)$, a second pair of said quantities being proportional respectively to cos $(\theta_1—\theta_R)$, and cos $(\theta_2—\theta_R)$ where $\theta_R$ is the phase of a reference frequency R and $\theta_1$ and $\theta_2$ represent the respective phases of successive ones of said input signal intervals; comprising first and second signal mixing and integrating means to which said input signal is simultaneously applied; each of said first and second signal mixing and integrating means comprising an amplifier having essentially infinite output impedance to which said input signal is applied, the output of said amplifier being connected serially through a first capacitor and a first switching means respectively to common ground, a second capacitor and second switching means being respectively serially interconnected with the series interconnection thereof being shunted by said first switching means, a third capacitor and third switching means respectively serially interconnected with the series interconnection thereof shunting said first switching means, a first output being taken across said second switching means, a second output being taken across said third switching means, and switching control means connected to said first and second signal mixing and integrating means whereby the first, second and third switching means associated with each of said first and second signal mixing and integrating means may be opened and closed in a predetermined manner, said switching control means during alternate ones of said input signal intervals effecting alternate closing of said first and third switching means at a rate defined by a sinusoidal function of the reference signal R while holding said second switching means open and during intervening ones of said input signal intervals effecting alternate closing of said first and second switching means at said sinusoidal function of the reference signal R while holding said third switching means open, said switching control means further comprising means to simultaneously close said first and third switching means for a predetermined period of time at the beginning of said alternate input signal intervals during which said first and third switches are alternately closed; said switching control means further comprising means to simultaneously close said first and second switches for a predetermined period of time at the beginning of said intervening input signal intervals during which time said first and second switching means are alternately closed, said first and second pairs of outputs being taken across the second and third switching means associated with said first and second signal mixing and integrating means, respectively, and means for sampling said first and second outputs for a predetermined time interval at the end of each successive input signal interval and during a period of time when said first switching means is closed and one of said second and third switching means is open.

16. Demodulating means as defined in claim 15 wherein said first, second and third switching means comprise transistors, the emitter-collector junctions of which are serially connected between the associated ones of said capacitors and said common ground, and said switching control means comprises means for generating gating waveforms in the form of complementary square waves with periodicity defined by said reference frequency during those intervals when alternate switching is effected between pairs of siad first, second and third transistors, said waveforms being held at a polarity to render pairs of said transistors conductive during those predetermined intervals of time during which pairs of said switching means are closed.

17. Demodulating means as defined in claim 16 wherein said reference frequency R equals that of said input signal, said gating waveforms effecting operation of the switching means associated with said first signal mixing and integrating means being based on sine and sine-complement functions of the reference frequency R, and said gating waveforms effecting operation of the switching means associated with said second signal mixing and integrating means being based on cosine and cosine-complement functions of the reference frequency R.

References Cited

UNITED STATES PATENTS

| | | | |
|---|---|---|---|
| 2,905,812 | 9/1959 | Doelz et al. | 332—9 X |
| 2,961,610 | 11/1960 | Hosenthien | 328—133 X |
| 3,025,411 | 3/1962 | Rumble | 328—67 X |
| 3,265,904 | 8/1966 | Spencer | 328—133 X |
| 3,278,851 | 10/1966 | Damon et al. | 307—88.5 |

ALFRED L. BRODY, *Primary Examiner*.